US008553270B2

(12) United States Patent
Miyake et al.

(10) Patent No.: US 8,553,270 B2
(45) Date of Patent: Oct. 8, 2013

(54) IMAGE FORMING APPARATUS

(75) Inventors: Kouji Miyake, Yamatokoriyama (JP); Tsutomu Yoshimoto, Yamatotakada (JP); Kaoru Ishikura, Kyoto (JP); Kenji Takahashi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 395 days.

(21) Appl. No.: 12/385,082

(22) Filed: Mar. 30, 2009

(65) Prior Publication Data

US 2009/0248752 A1 Oct. 1, 2009

(30) Foreign Application Priority Data

Mar. 31, 2008 (JP) ................................ 2008-091027

(51) Int. Cl.
*G03B 35/14* (2006.01)
*G03B 35/16* (2006.01)

(52) U.S. Cl.
USPC .......................................... 358/1.16; 707/662

(58) Field of Classification Search
None
See application file for complete search history.

(56) References Cited

U.S. PATENT DOCUMENTS

| | | | | |
|---|---|---|---|---|
| 5,905,582 | A | 5/1999 | Hirai et al. | |
| 6,738,157 | B1 | 5/2004 | Hirose | |
| 6,750,878 | B1 | 6/2004 | Tatsuo et al. | |
| 6,978,284 | B2 * | 12/2005 | McBrearty et al. | 1/1 |
| 2002/0033960 | A1 * | 3/2002 | Kazami | 358/1.14 |
| 2003/0072582 | A1 | 4/2003 | Oyaide | |
| 2003/0123078 | A1 | 7/2003 | Kazami | |
| 2004/0078724 | A1 | 4/2004 | Keller et al. | |
| 2004/0139385 | A1 | 7/2004 | Sakaue | |
| 2005/0180792 | A1 | 8/2005 | Arai | |
| 2005/0237569 | A1 | 10/2005 | Takahashi | |
| 2005/0248807 | A1 | 11/2005 | Kuroyanagi | |
| 2006/0007469 | A1 | 1/2006 | Uruma | |
| 2006/0018628 | A1 * | 1/2006 | Mizuno et al. | 386/46 |
| 2006/0045544 | A1 | 3/2006 | Kim et al. | |
| 2007/0220359 | A1 | 9/2007 | Mochizuki | |
| 2008/0089709 | A1 | 4/2008 | Higashi | |
| 2008/0144070 | A1 * | 6/2008 | Mori et al. | 358/1.13 |
| 2008/0260416 | A1 | 10/2008 | Nosaki | |
| 2009/0225348 | A1 | 9/2009 | Miyake et al. | |
| 2009/0225357 | A1 | 9/2009 | Miyake et al. | |
| 2009/0237701 | A1 | 9/2009 | Ishikura et al. | |
| 2009/0262379 | A1 | 10/2009 | Miyake et al. | |

FOREIGN PATENT DOCUMENTS

| | | | |
|---|---|---|---|
| CN | 101030069 | A | 9/2007 |
| JP | 6-261166 | | 9/1994 |
| JP | 2001-016388 | A | 1/2001 |
| JP | 2001-018501 | | 1/2001 |
| JP | 2002-111940 | A | 4/2002 |

(Continued)

*Primary Examiner* — Ajay Bhatia
*Assistant Examiner* — Miranda Huang
(74) *Attorney, Agent, or Firm* — Edwards Wildman Palmer LLP; David G. Conlin; David A. Tucker

(57) ABSTRACT

In an image forming apparatus, even when power supply to the apparatus is stopped, it is possible to let the user recognize that an electronic file to be used has been erased, and that a necessary electronic file will be erased when the apparatus is to be used after next power on, so that wasteful power supply to the apparatus can be reduced. When the power is shut off, an auto-erased file list or a to-be-erased file list is displayed on electronic paper 108, in accordance with display setting contents set by the user before power off.

5 Claims, 11 Drawing Sheets

(56) References Cited

FOREIGN PATENT DOCUMENTS

| | | | |
|---|---|---|---|
| JP | 2003-110763 | | 4/2003 |
| JP | 2003-209718 | | 7/2003 |
| JP | 2006-20263 | | 1/2006 |
| JP | 2006-021501 | A | 1/2006 |
| JP | 2006-139145 | | 6/2006 |
| JP | 2006-201460 | | 8/2006 |
| JP | 2007-331121 | | 12/2007 |
| JP | 2008-149602 | | 7/2008 |

* cited by examiner

IMAGE FORMING APPARATUS

CROSS-REFERENCE TO RELATED APPLICATION

This nonprovisional application claims priority under 35 U.S.C. §119(a) on Patent Application No. 2008-091027 filed in Japan on Mar. 31, 2008, the entire contents of which are hereby incorporated by reference.

BACKGROUND OF THE INVENTION

1. Field of the Invention

The present invention relates to an image forming apparatus in which a stored electronic file is erased when a retention period expires or a designated time is reached.

2. Description of the Background Art

Electronic paper is a thin display technology similar to a liquid crystal display and the like, and it has similar appearance as ordinary paper. The electronic paper is characterized in that displayed contents are electrically rewritable, and that power consumption thereof is very low as electric power is unnecessary to retain the displayed contents. In addition, electronic paper is non-volatile, that is, once the displayed contents are rewritten, the displayed contents are maintained even when power is turned off. Attempts to apply electronic paper as such have been made in various technical fields.

Japanese Patent Laying-Open No. 2003-209718 (Document 1) proposes a technique of utilizing electronic paper in a digital camera. According to the technique disclosed in Document 1, when a power button is pressed by a user while the power is on, remaining battery level is calculated, and the maximum number of pictures that can be taken is calculated from available memory space. These pieces of calculated information are output to electronic paper, and on the electronic paper, information related to the remaining battery level and the maximum number of pictures that can be taken at present is displayed. Even when the power of digital camera is turned off thereafter, the displayed contents of information related to the remaining battery level and the maximum number of pictures that can be taken before power-off are maintained.

Further, Japanese Patent Laying-Open No. 2006-201460 (Document 2) proposes a technique of utilizing electronic paper in an image forming apparatus such as a multifunctional printer. According to the technique disclosed in Document 2, information related to image formation, such as counter information and information of supplies, is displayed on electronic paper. This allows collection of necessary pieces of information without turning on the power.

SUMMARY OF THE INVENTION

Among recent image forming apparatuses such as digital multifunctional peripherals, some have a function of erasing a stored electronic file when a retention period expires or a designated time is reached.

In designing an image forming apparatus having such a function, it has been a problem to let the user be aware of the fact that an electronic file to be used has been erased, and that a necessary electronic file will be erased when the apparatus is to be used after next power on, even after power supply to the apparatus is shut-off, and thereby to reduce wasteful power supply to the apparatus.

Though it is possible by the techniques described in Documents 1 and 2 to transmit necessary information to the user or service person even when power is off by displaying information before power off on the electronic paper, the idea described above cannot be realized. Specifically, in order to solve such a problem, the techniques described in Documents 1 and 2 cannot directly be adopted.

The present invention was made in view of the foregoing, and its object is to provide an image forming apparatus that allows the user to know the fact that an electronic file to be used has been erased, and that a necessary electronic file will be erased when the apparatus is to be used after next power on, even after power supply to the apparatus is shut-off, and thereby reduces wasteful power supply to the apparatus.

In order to attain the above-described object, the present invention provides an image forming apparatus, including: an input unit for inputting an image; a storage unit for storing the image input by the input unit; an erasing unit erasing the image stored in the storage unit when retention period expires or a designated time is reached; a first display unit displaying state of the apparatus when power is supplied to the apparatus; a second display unit maintaining displayed contents when power is not supplied; and a selecting unit selecting a content related to image erasure to be displayed on the second display unit.

In the arrangement above, even in the non-conductive state, displayed contents of the second display unit can be maintained and, therefore, even if the operation of the apparatus is stopped, display to the user can be continued. Therefore, even when power supply to the apparatus is shut off, it is possible for the user to know that an electronic file to be used has been erased, and that a necessary electronic file will be erased when the apparatus is to be used after next power on. As a result, it is possible for the user to understand the state of the electronic file before turning the power on, and wasteful power supply to the apparatus can be reduced.

In the image forming apparatus described above, the second display unit is a non-volatile display member.

In the arrangement above, even when the second display unit is in the non-conduction state, the contents displayed thereon can be retained. Therefore, it is possible to continue display for the user even while the apparatus is suspended, and necessary message can be given to the user without wasting power.

An example of the "non-volatile display device" may include electronic paper.

In the image forming apparatus above, preferably, the second display unit also serves as the first display unit.

The arrangement above enables display both during the time of power conduction and during the time of non-conduction without increasing cost of the apparatus, and it is unnecessary for the user to see a plurality of displays. Therefore, interface with the user is not degraded.

Further, in the image forming apparatus described above, contents displayed on the second display unit include a list of jobs automatically erased when power was supplied last time to the apparatus.

Further, in the image forming apparatus described above, contents displayed on the second display unit include a list of jobs automatically erased during an operation of the apparatus.

Further, in the image forming apparatus described above, the job list includes a file or folder name, name of a user who registered the job, time of erasure or expected time of erasure.

In addition, in the image forming apparatus described above, the job list is displayed on the second display unit also when power is supplied.

By the arrangement above, it is possible for the user to confirm the electronic file information that has been continuously displayed on the second display unit, when the power supply is resumed.

According to the present invention, even when power supply to the apparatus is shut off, it is possible for the user to know that an electronic file to be used has been erased, and that a necessary electronic file will be erased when the apparatus is to be used after next power on. As a result, wasteful power supply to the apparatus can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the appended figures.

<Overall Configuration of Image Forming Apparatus 20>

Figure 1:
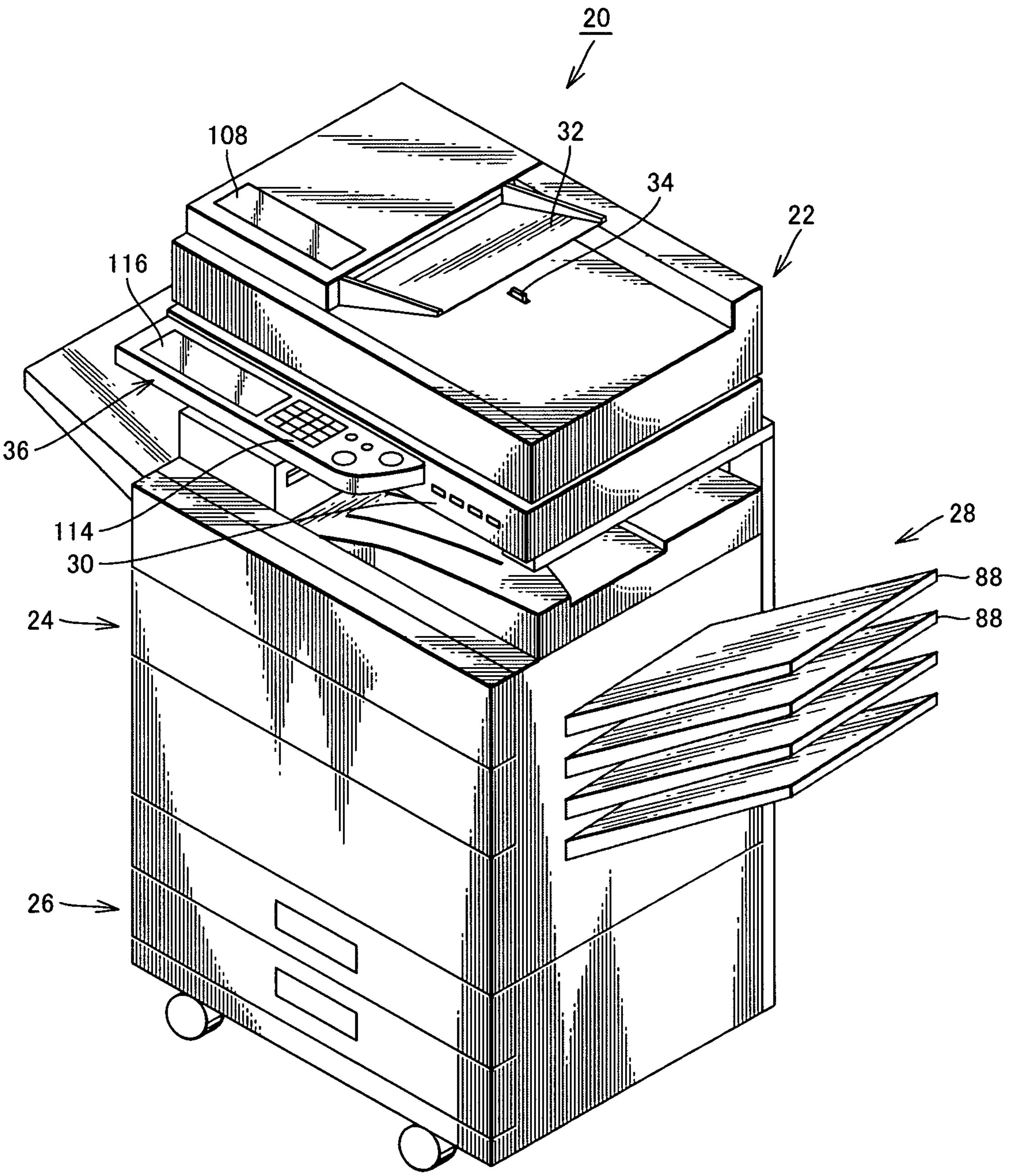
FIG. 1 is a perspective view showing an outer appearance of an image forming apparatus in accordance with an embodiment of the present invention.
Figure 2:
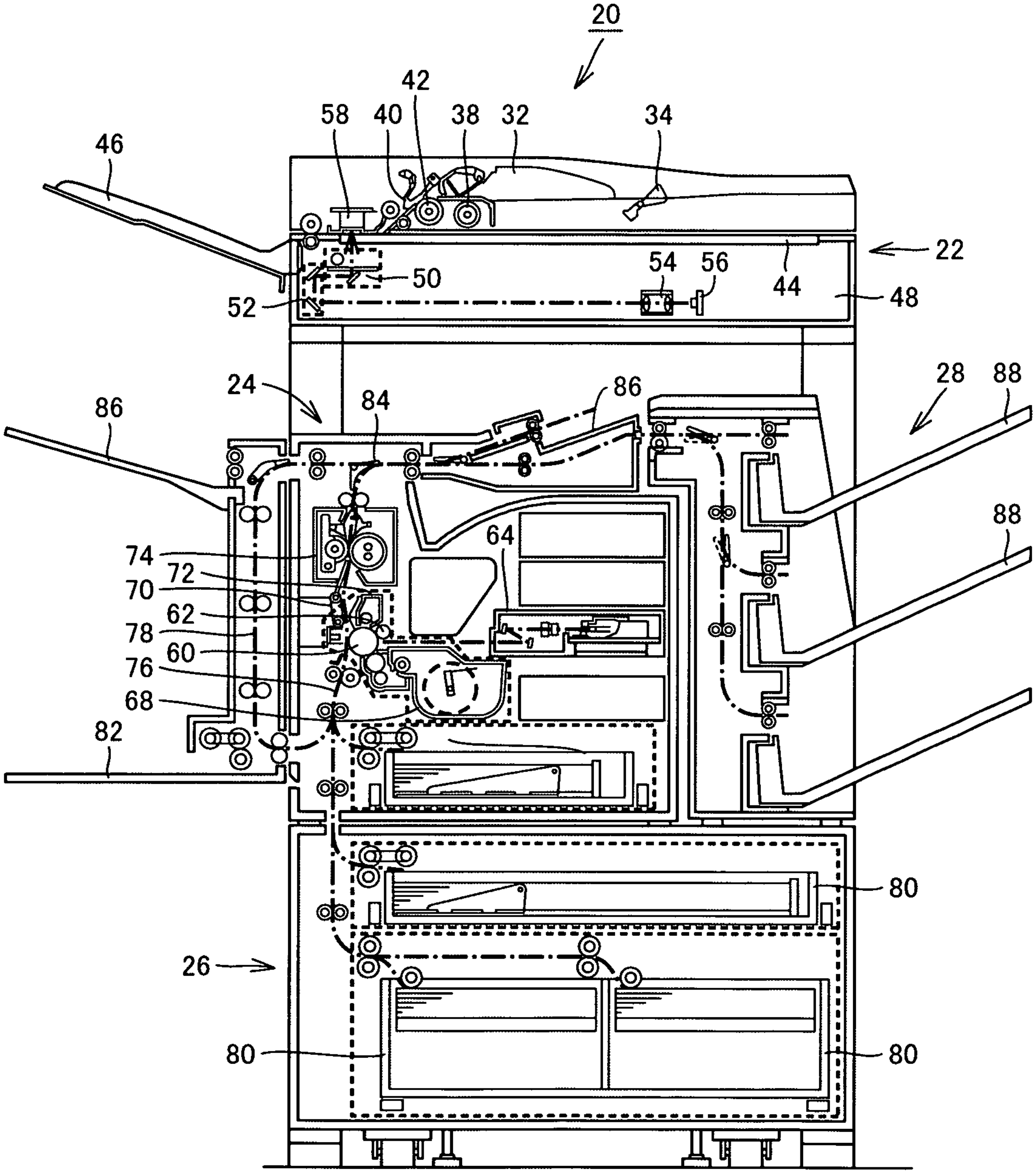
FIG. 2 schematically shows an internal configuration of the image forming apparatus.

FIG. 1 is a perspective view showing an appearance of an image forming apparatus 20 in accordance with the embodiment of the present invention, and FIG. 2 schematically shows an internal configuration of image forming apparatus 20.

Referring to FIGS. 1 and 2, an image forming apparatus 20 in accordance with the present embodiment is a digital multifunctional printer, and it is capable of operating selectively in, for example, a copy mode in which an image of a document is read and printed on a sheet of printing paper, a facsimile mode in which an image of a document is read and transmitted and an image of a document is received and printed on a sheet of printing paper, and a printer mode in which an image received through a network from an information terminal, not shown, is printed on a sheet of printing paper.

Image forming apparatus 20 includes a document feeding and reading unit 22, an image forming unit 24, a paper feeding unit 26, a post processing device 28, and a USB (Universal Serial Bus) interface 30.

Internal configuration of image forming apparatus 20 will be described taking an operation in the copy mode as an example.

When a document is set on a document set tray 32 of document feeding and reading unit 22, a document detection sensor 34 detects that the document has been set. Operating unit 36 of document feeding and reading unit 22 is operated to input and set size of printing paper, magnification and the like. Thereafter, an instruction to start copying is given in accordance with the contents of operation on operating unit 36.

In response to an operation of operating unit 36, document feeding and reading unit 22 draws the document on document set tray 32 one by one, by pick-up roller 38, and feeds the drawn document to a platen glass 44 through a separation plate 40 and a feed roller 42, feeds the document in a sub-scanning direction on platen glass 44, and discharges the document to a document discharge tray 46.

At this time, a surface (lower surface) of the document is read by a first reading unit 48. Specifically, the first reading unit 48 first moves and positions a first scanning unit 50 to a prescribed position, and positions a second scanning unit 52 at a prescribed position. The document surface is irradiated through platen glass 44 with an exposure lamp of first scanning unit 50, and light reflected from the document is directed to an imaging lens 54 through reflection mirrors of first and second scanning units 50 and 52. The light reflected from the document is collected by imaging lens 54 to a CCD (Charge Coupled Device) 56, and the image on the document surface is formed on CCD 56, whereby the image on the document surface is read.

Further, a rear surface (upper surface) of the document is read by the second reading unit 58. The second reading unit 58 is arranged above platen glass 44. The second reading unit 58 includes an exposure lamp, formed of an LED (Light Emitting Diode) array, a fluorescent lamp and the like, irradiating the rear surface of document, a SELFOC (registered trademark) lens array collecting light reflected from the document pixel by pixel, and a contact image sensor (CIS) performing photo-electric conversion of the light reflected from the document received through SELFOC lens array and outputting an analog image signal.

Further, it is possible to open an upper part of document feeding unit 22 and to place a document on platen glass 44, and to read the document surface in this state by the first reading unit 48. In this case, the first and second scanning units 50 and 52 are moved in the sub-scanning direction while maintaining a prescribed speed relation to each other, whereby the document on platen glass 44 is exposed by the first scanning unit 50 and the light reflected from the document is guided by the first and second scanning units 50 and 52 to imaging lens 54. The document image is formed on CCD 56 by the imaging lens 54.

Figure 3:
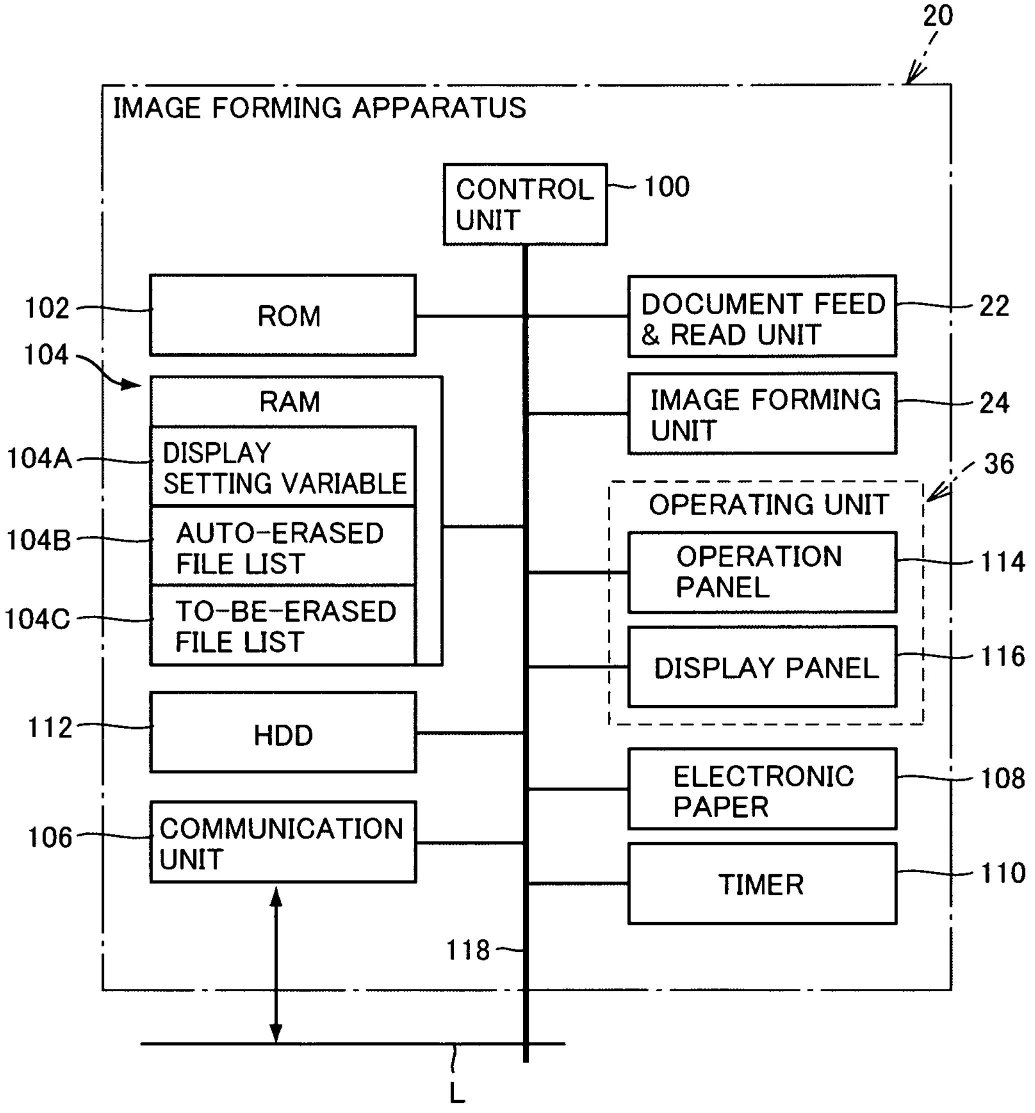
FIG. 3 is a block diagram showing hardware configuration of the image forming apparatus.

When one or both surfaces of the document are read in the above-described manner, image data representing the image or images on one or both surfaces of the document is input to a control unit 100 implemented, for example, by a microcomputer shown in FIG. 3, in which the image data is subjected to various types of image processing and output to image forming unit 24.

Image forming unit 24 prints the document image on a sheet of recording paper based on the image data, and it includes a photoreceptor drum 60, a charger 62, a laser scanning unit (hereinafter denoted as "LSU") 64, a developer 68, a transfer device 70, a cleaning device 72, a fixing device 74, a neutralizer, not shown, and the like.

Further, image forming unit 24 is provided with a main feeding path 76 and a reverse feeding path 78. A sheet of recording paper fed from paper feeding unit 26 is fed along main feeding path 76. Paper feeding unit 26 draws sheets of recording paper contained in paper cassette 80 or placed on a manual feed tray 82 one by one, and feeds the drawn sheet of recording paper to main feeding path 76 of image forming unit 24.

While the sheet of paper is fed along main feeding path 76 of image forming unit 24, that is, while the sheet of paper passes between photoreceptor drum 60 and transfer device 70 and further through fixing device 74, printing is done on the sheet of recording paper.

Photoreceptor drum 60 rotates in one direction, and its surface is cleaned by cleaning device 72 and the neutralizer, and then uniformly charged by charger 62.

LSU 64 modulates laser beam based on the image data output from document feeding and reading unit 22, and repeatedly scans the surface of photoreceptor drum 60 with the laser beam in the main scanning direction, whereby an electrostatic latent image is formed on the surface of photoreceptor drum 60.

Developer 68 develops the electrostatic latent image by supplying toner to the surface of photoreceptor drum 60, and forms a toner image on the surface of photoreceptor drum 60.

Transfer device 70 transfers the toner image on the surface of photoreceptor drum 60, to the sheet of recording paper passing through transfer device 70 and photoreceptor drum 60.

Fixing device 74 fixes the toner image on the sheet of recording paper, by applying heat and pressure to the sheet of recording paper.

At a connecting position between main feeding path 76 and reverse feeding path 78, a branching pawl 84 is provided. When printing is to be done only on one side of the sheet of recording paper, branching pawl 84 is positioned such that the sheet of recording paper fed from fixing device 74 is guided by branching pawl 84 to discharge tray 86 or to a post processing device 28.

When printing is to be done on both surfaces of the sheet of recording paper, branching pawl 84 is turned in a prescribed direction so that the sheet of recording paper is guided to reverse feeding path 78. The sheet of recording paper is turned over as it passes through reverse feeding path 78, and then it is again fed to the main feeding path 76 and, as the sheet of recording paper is again fed along the main feeding path 76, printing is done on the rear surface, and the sheet is guided to discharge tray 86 or post processing device 28.

The sheet of recording paper on which printing has been done as described above is guided to discharge tray 86 or post processing device 28, and discharged to discharge tray 86 or to any of discharge trays 88 of post processing device 28.

Post processing device 28 is for performing processes of sorting and discharging a plurality of sheets of recording paper to discharge trays 88, punching each sheet of recording paper, and stapling the sheets of paper. By way of example, when a number of printed copies are to be prepared, post processing device 28 sorts and discharges sheets of recording paper to discharge trays 88 such that sorted sets of copies are allotted one by one, and each set of sheets on each discharge tray 88 is punched or stapled, whereby printed copies are provided.

<Hardware Configuration of Image Forming Apparatus 20>

FIG. 3 is a block diagram showing a hardware configuration of image forming apparatus 20.

Referring to FIG. 3, image forming apparatus 20 includes document feeding and reading unit 22 capable of reading document image, image forming unit 24 providing printed output by forming an image read by document feeding and reading unit 22 on a sheet of paper with the image color reproduced by electro-photographic process, operating unit 36 allowing settings of various functions related to the image forming process as described above, and, in addition, a control unit 100, an ROM (Read Only Memory) 102, an RAM (Random Access Memory) 104, a communication unit 106, an electronic paper 108, a timer 110 and an HDD (Hard Disk Drive) 112.

Operating unit 36 includes an operation panel 114 and a display panel 116. Appearances of operation panel 114 and display panel 116 will be described later.

Control unit 100 is in charge of overall control of image forming apparatus 20, and it is implemented by a CPU (Central Processing Unit) or the like.

ROM 102 stores a program, data and the like necessary for controlling an operation of image forming apparatus 20. Control unit 100 controls image forming apparatus 20 in accordance with the program and data stored in ROM 102, and executes control related to various functions of image forming apparatus 20.

RAM 104 has a function of a working memory temporarily storing results of operations and processes performed by control unit 100, a function of a back-up memory storing count value, jam and service error history information, information of supplies and the like and a function of a frame memory storing image data.

Communication unit 106 provides an interface to a network line L connected to a personal computer (hereinafter denoted as a "PC") and a facsimile apparatus, not shown.

Displaying operation of electronic paper 108 is realized by physically moving media particles by applying bias (electrophoresis). Even when power conduction is stopped, the moved particles (that went under electrophoresis) of electronic paper 108 can retain their state and, as a result, the displayed contents are maintained. Specifically, electronic paper 108 is a non-volatile display member of which displayed contents can be kept continuously even after power conduction to display panel 116 is shut off, and it functions as an auxiliary display unit of display panel 116. Electronic paper 108 is attached to the top plate of document feeding and reading unit 22, as shown in FIG. 1.

HDD 112 is provided to realize a document filing function for storing input image data of image forming apparatus 20. The document filing function refers to the function of receiving an image read by a scanner and an image transmitted from the outside, for example, from the PC or the facsimile apparatus, and storing the received images in HDD 112. The images stored in HDD 112 are managed by RAM 104. The stored image may be read by the PC, printed by the operation on operation panel 114, or transmitted to the outside by a transmission tool such as facsimile or electric mail. Further, document filing involves a security function using a password for protecting the stored image, and a management function of managing images stored in HDD 112.

The management function is to set a period of validity of an image, when the image is stored in HDD 112. It sets the period of validity from the time of storage to HDD 112 until erasure, or date and time of erasure after storage to HDD 112. Therefore, control unit 100 looks up a management table in RAM 104 and grasps the timing of erasure of each image, and when the erasure timing is reached, control unit 100 automatically erases the object image.

The retention period or designated time used as the erasure timing of the image is measured by timer 110.

Particularly, in the present embodiment, RAM 104 includes, formed therein, a display setting variable storage area 104A for storing a value of variable D indicating setting of the manner of displaying the image on electronic paper 108 (hereinafter simply referred to as "display setting variable"), an auto-erased file list storage area 104B for storing a list of files that have been automatically erased during an operation of image forming apparatus 20 (hereinafter simply referred to as "auto-erased file list"), and a to-be-erased file list storage area 104C for storing a list of files that are expected to be erased after the next power on (hereinafter simply referred to as "to-be-erased file list"). When a first operation for displaying the auto-erased file list on electronic paper 108 is made by the user through operation panel 114, the display setting variable D is set to "0". On the other hand, when a second operation for displaying the to-be-erased file list on electronic paper 108 is made by the user through operation panel 114, the display setting variable D is set to "1".

Document feeding and reading unit 22, image forming unit 24, ROM 102, RAM 104, operation panel 114 and display panel 116 of operating unit 36, communication unit 106, electronic paper 108, timer 110 and HDD 112 described above are connected to a bus 120 extending from control unit 100. Therefore, document feeding and reading unit 22, image forming unit 24, ROM 102, RAM 104, operation panel 114 and display panel 116 of operating unit 36, communication unit 106, electronic paper 108, timer 110 and HDD 112 are controlled by control unit 100.

In the present embodiment, control unit 100 performs power conduction control of a driving power source, not shown, on document feeding and reading unit 22, image forming unit 24, operating unit 36, communication unit 106 and electronic paper 108 described above, at the time of transition from normal operation mode to a standby mode in which power consumption is limited, and from the standby mode to normal operation mode.

Further, control unit 100 forms display data based on data stored in RAM 104 and the like, and controls electronic paper 108 such that the display data is displayed thereon.

<Appearance of Operating Unit 36>

Figure 4:
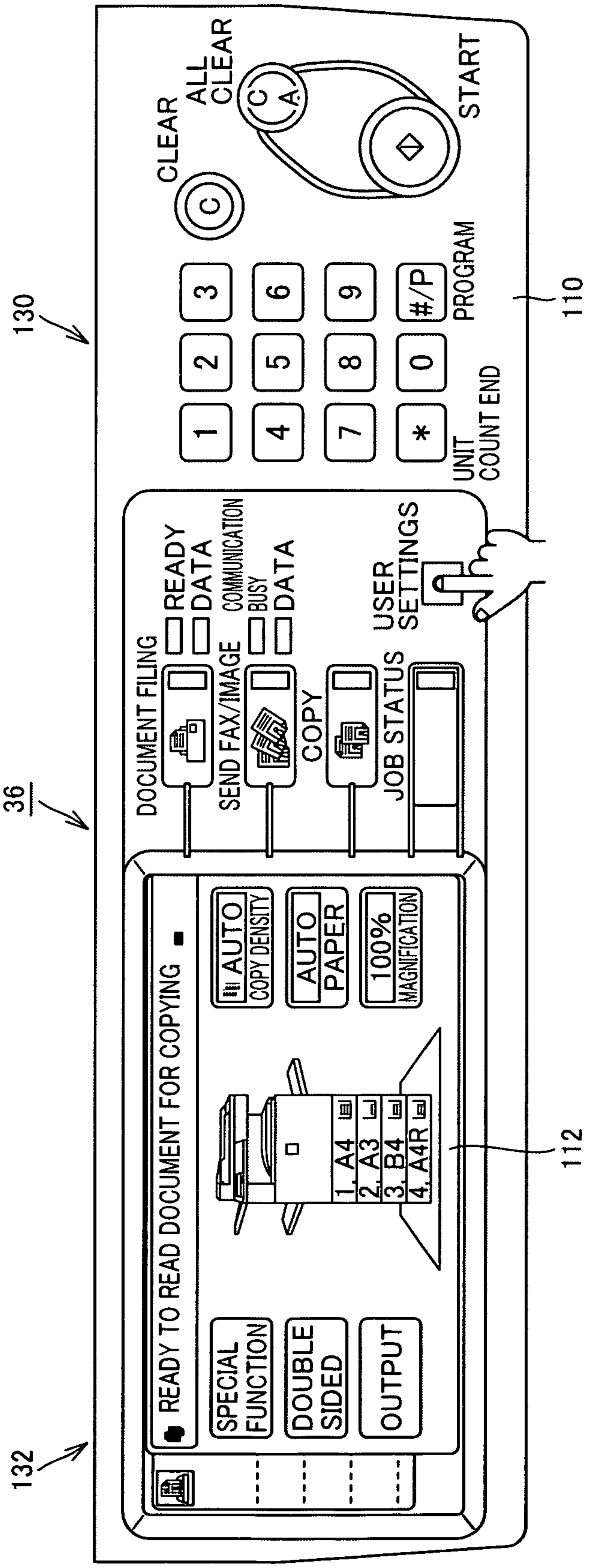
FIG. 4 is a plan view showing an appearance of an operating unit.

FIG. 4 is a plan view showing an appearance of operating unit 36.

Referring to FIG. 4, operating unit 36 is formed by integrating operation panel 114 and display panel 116. Operating unit 36 is divided into two areas 130 and 132.

Specifically, operation panel 114 is placed on the right area 130 of operating unit 36, and on which ten keys and various other operation buttons are provided. On the other hand, display panel 116 is arranged from the center to the left area 132 of operating unit 36, and it is formed of a small, touch-panel integrated type liquid crystal display.

It is possible to confirm the state of image forming apparatus 20, job processing status, and the like, from the display on display panel 116 of operating unit 36. Further, it is possible to set functions and to instruct an operation of image forming apparatus 20 and the like, by selecting, on the touch panel superposed on the display area, a select button displayed on the display area of liquid crystal display of display panel 116.

<Software Configuration>

In the present embodiment, a program is provided that displays, when the power is shut off, the auto-erased file list or the to-be-erased file list on electronic paper 108 in accordance with contents of display setting set by the user before shut-off.

The program is stored in ROM 102, and realizes the function of image forming apparatus 20 described in the following. The function is realized by control unit 100 including a CPU executing the above-described program.

Figure 5:
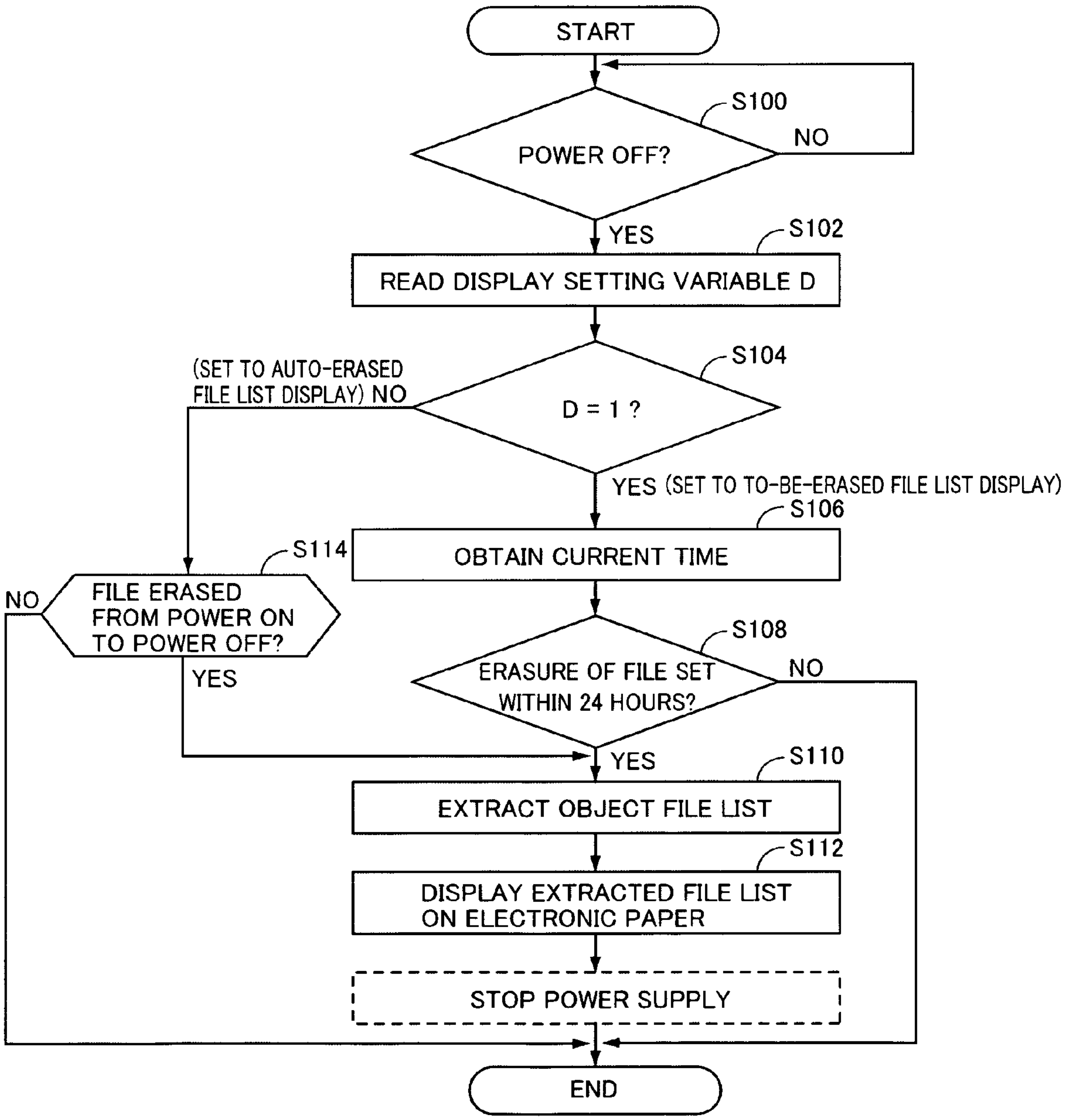
FIG. 5 shows, in the form of a flowchart, a structure of a file list display program of the image forming apparatus.

FIG. 5 shows, in the form of a flowchart, a structure of the file list display program of image forming apparatus 20.

Referring to FIG. 5, first, control unit 100 waits for power-off (step S100). When the power is shut off, using detection of voltage drop as a trigger, an access to RAM 104 and post-processing of image processing are performed, and at the same time, a display writing process to electronic paper 108 is executed.

When power-off is detected, control unit 100 accesses to the display setting variable storage area 104A of RAM 104, and reads the display setting variable D, that is, display conditions for electronic paper 108 set in advance by the user (step S102).

Thereafter, control unit 100 determines whether the value of display setting variable D is "1" or not, that is, whether the content to be displayed on electronic paper 108 is the list of files automatically erased during operation of image forming apparatus 20 (auto-erased file list), or a list of files to be erased after the next power on (to-be-erased file list) (step S104). The control branches depending on the result of determination.

As a result of determination of display content at step S104, if the value of display setting variable D is "1" and the content to be displayed on electronic paper 108 is the to-be-erased file list, control by control unit 100 proceeds to step 106, at which current time is obtained from the output of timer 110. Then, control unit 100 determines whether there is a file to be erased within 24 hours from the current time (step S108). If there is no such file (NO at step S108), control unit 100 terminates the present program. If there is a file as the object of erasure (YES at step 108), control unit 100 extracts the object file from to-be-erased file list storage area 104C of RAM 104 (step S110), and displays the extracted to-be-erased file list on electronic paper 108 (step S112). Thereafter, control unit 100 ends the program and waits until power supply is stopped.

On the contrary, from the result of determination of display content at step S104, if the value of display setting variable D is "0" and the auto-erased file list is to be displayed during the operation of image forming apparatus 20 with the power supply of this time, control unit 100 determines whether or not there is any file that has been automatically erased from power on to the present time point, with the power supply of this time (step S114). Only when there is an object file (YES at S114), control by control unit 100 proceeds to step S110, at which the object file or files are extracted from auto-erased file list storage area 104B of RAM 104. Thereafter, control unit 100 displays the extracted auto-erased file list on electronic paper 108 (step S112), ends the present program and waits until power supply is stopped.

As the series of control operations described above is executed, it becomes possible to display an erasure list or erasure object list as desired by the user. Therefore, user interface can be improved without wasteful power supply.

<Operation>

Image forming apparatus 20 has the document filing function of storing input image data. Therefore, an image read by a scanner, and an image transmitted from the outside, for example, from a PC and a facsimile apparatus are received, and the received images are stored in HDD 112. The images stored in HDD 112 are managed in RAM 104.

Further, for the document filing, the security function using a password for protecting stored images, and the management function of managing images stored in HDD 112 are set. The management function is to set a period of validity of an image, when the image is stored in HDD 112. It sets the period of validity from the time of storage to HDD 112 until erasure, or date and time of erasure after storage to HDD 112. Therefore, control unit 100 looks up a management table (a concept including auto-erased file list storage area 104B and to-be-erased file list storage area 104C) in RAM 104 and grasps the timing of erasure of each image, and when the erasure timing is reached, control unit 100 automatically erases the object image.

Figure 6:
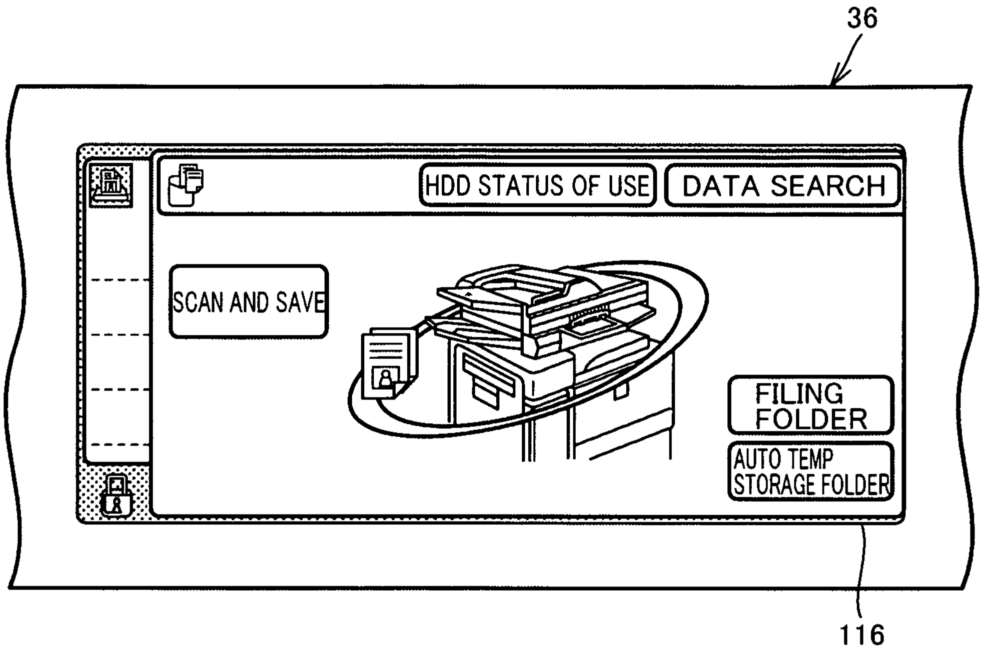
FIG. 6 shows an initial image of "DOCUMENT FILING" when "DOCUMENT FILING" is selected on the operation panel, displayed on the display panel.

FIG. 6 shows an initial image of "DOCUMENT FILING" when "DOCUMENT FILING" is selected on the operation panel. On the initial image, various icons are displayed on display panel 116 to let the user recognize that document filing includes, as main functions, "HDD STATUS OF USE", "DATA SEARCH", "SCAN AND SAVE", "FILING FOLDER" and "TEMPORARY STORAGE".

Figure 7:
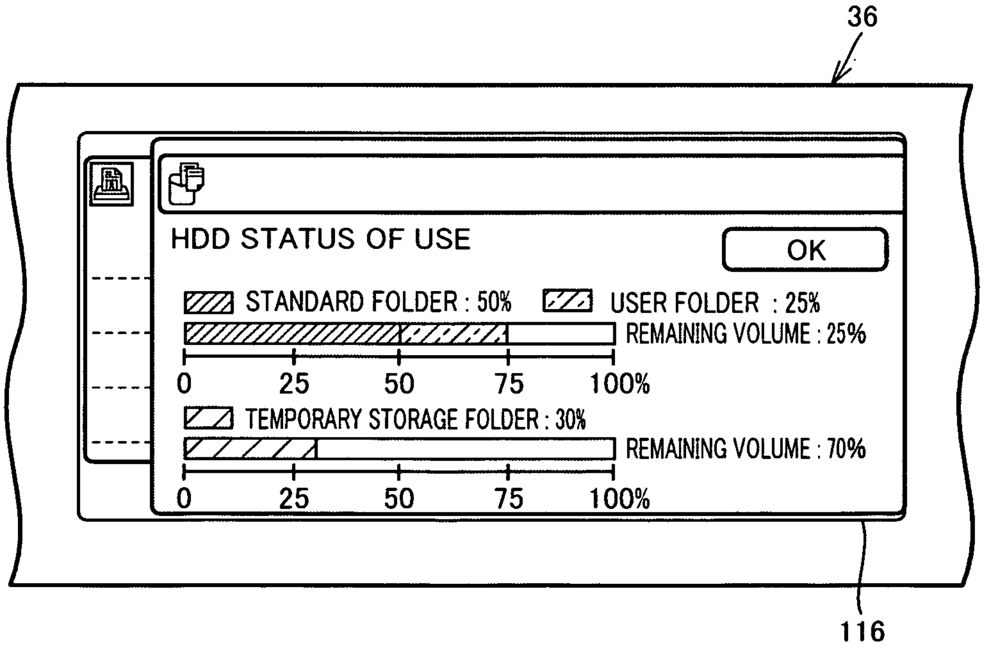
FIG. 7 shows an HDD status of use confirming image displayed on the display panel.

FIG. 7 shows an HDD status of use confirming image, that is, an image for confirming data volume stored in HDD 112. Here, the image is displayed on display panel 116 such that the storage capacity and free space of both the "STANDARD FOLDER" and "TEMPORARY STORAGE FOLDER" can be recognized independently.

Figure 8:
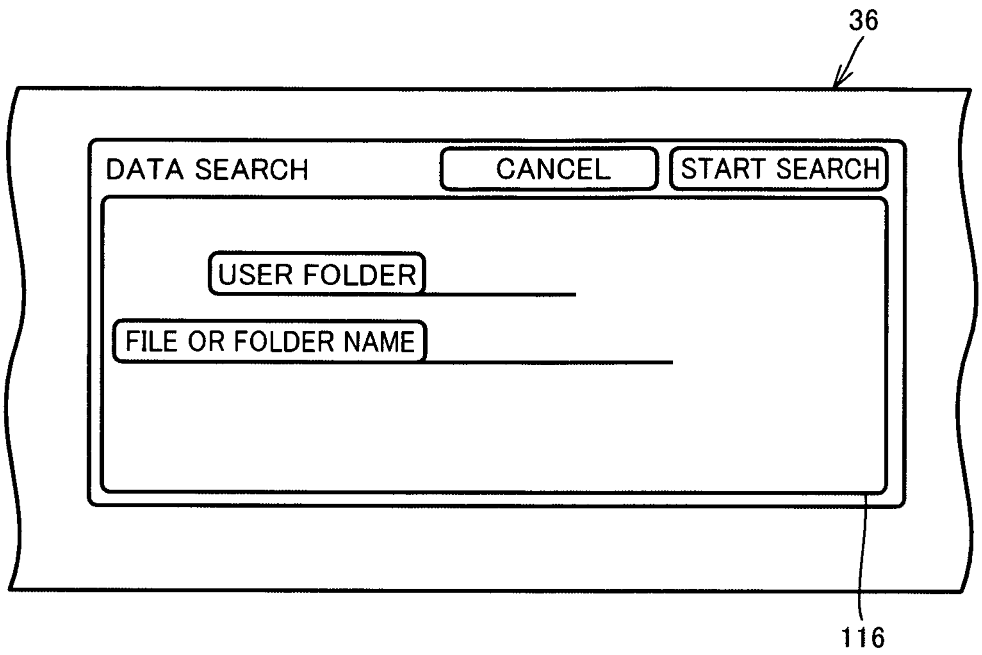
FIG. 8 shows a "DATA SEARCH" image displayed on the display panel.

FIG. 8 shows a "DATA SEARCH" image. This image is displayed on display panel 116 to allow searching of a file stored in each folder, based on a user name, a file name or a folder name.

In image forming apparatus 20, when an image is to be filed, filing is classified to "FILING FOLDER" with the folder name set in advance by the user, and "TEMPORARY STORAGE" for temporarily storing the image.

Figure 9:
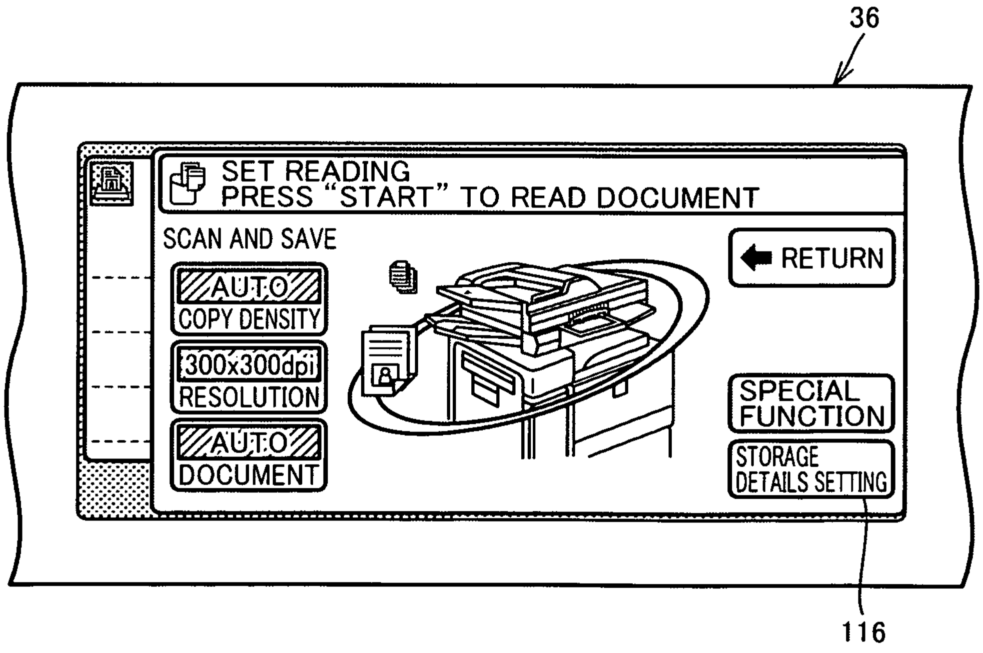
FIG. 9 shows an image when "SCAN AND SAVE" displayed on the display panel is selected.
Figure 10:
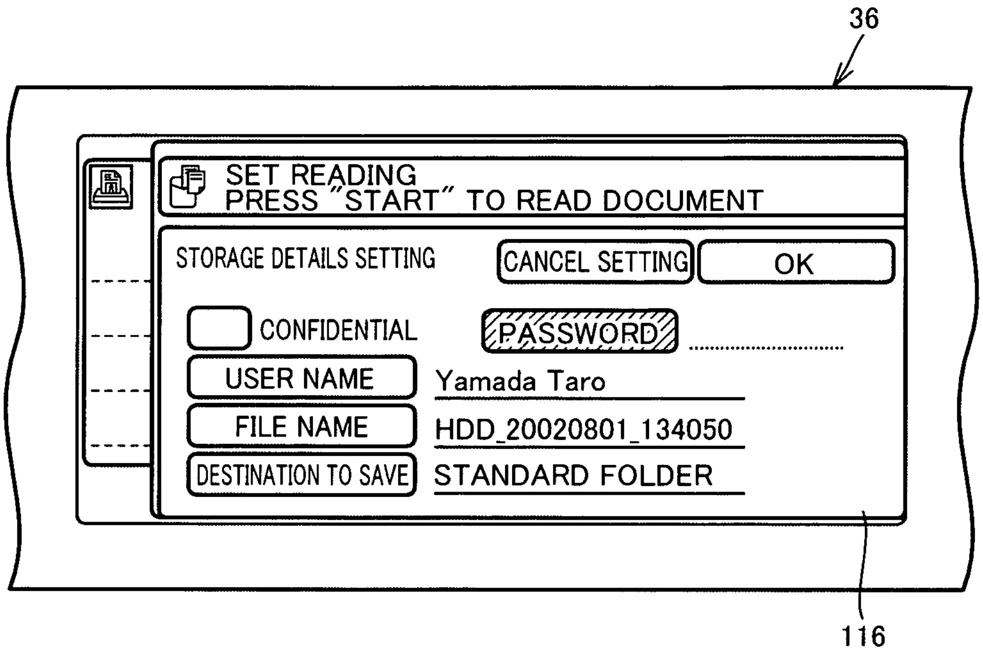
FIG. 10 shows an image after transition from FIG. 9.

FIG. 9 an image when "SCAN AND SAVE" is selected. The image is displayed on display panel 116, and when density, resolution and the like are selected on the image and storage details setting is selected thereafter, the image make a transition to the one shown in FIG. 10, allowing setting for storage.

When power off is detected, display conditions to electronic paper 108 set in advance by the user are read, and determination is made as to whether the content to be displayed on electronic paper 108 is the list of files automatically erased during the operation of image forming apparatus 20 (auto-erased file list) or the list of files to be erased after next power on (to-be-erased file list).

As a result of determination of display content, if the content to be displayed on electronic paper 108 is the to-be-erased file list, the current time is obtained, and whether or not there is a file to be erased within 24 hours from the current time is determined. Here, if there is a file as the object of erasure, the object file is extracted, and the extracted to-be-erased file list is displayed on electronic paper 108. Thereafter, power supply is stopped.

On the other hand, as a result of determination of display content, if the auto-erased file list is to be displayed during the operation of image forming apparatus 20 with the power supply of this time, whether there is any file that has been automatically erased from the present power-on to the current time or not is determined. If there is such a file, the object file is extracted, and the extracted auto-erased file list is displayed on electronic paper 108. Then, power supply is stopped.

Figure 11:
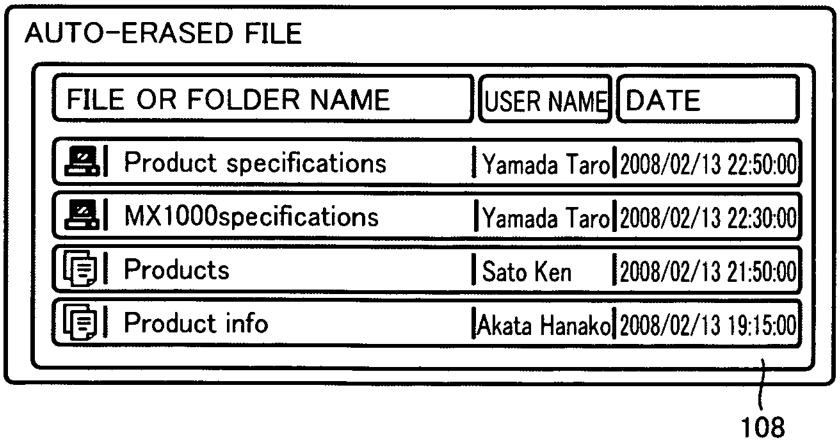
FIG. 11 shows an auto-erased file list, displayed on the electronic paper after power off.
Figure 12:
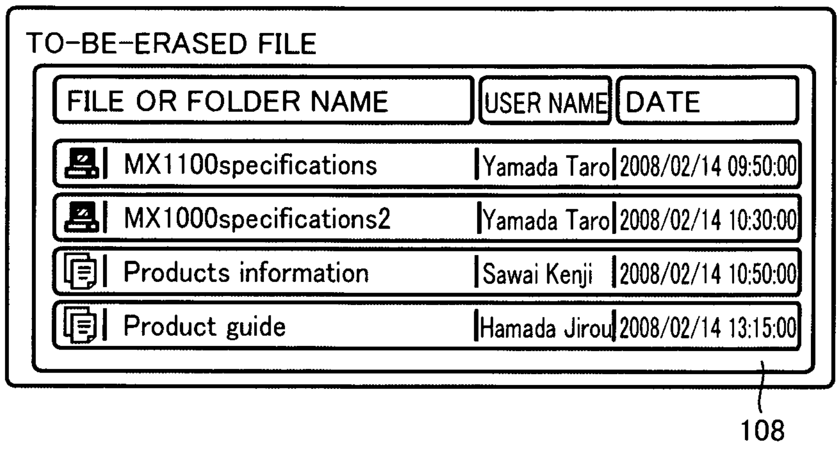
FIG. 12 shows a to-be-erased file list, displayed on the electronic paper after power off.

FIGS. 11 and 12 show contents displayed on electronic paper 108 after the power is shut off. The file list (job list) on the displayed image of these figures includes a file or folder name, a user name of the user who registered the job, time of erasure or expected time of erasure.

The example of FIG. 11 shows an image after power supply to image forming apparatus 20 was shut off on Feb. 13, 2008, and a list of files that had been automatically erased due to expiration or time setting before power off of image forming apparatus (auto-erased file list) is displayed. In the display here, the number of erased files is small. The display is adapted such that, if a large number of files had been erased and all cannot be displayed on the image, files that could be displayed immediately before power off of the day are displayed. Therefore, when the user uses the image forming apparatus 20 on the next day, he/she can recognize the automatically erased files. When the user intends to print, he/she can recognize if the object file has been erased. As a result, wasteful power supply to image forming apparatus 20 can be prevented, and wasteful power consumption can be prevented.

The example of FIG. 12 shows an image after power supply to image forming apparatus 20 was shut off on Feb. 13, 2008, and a list of files to be erased after the next power on (to-be-erased file list) is displayed. Files, for which automatic erasure after the time of power off of image forming apparatus 20 has been set, are extracted and displayed as a list. Therefore, files that are about to be erased can be presented to the user who is going to turn on the power to use image forming apparatus 20. As a result, if there is any file in the list that should not be erased, the user may change the setting of validity period of the file or transmit the file to another apparatus, so as to prevent loss of the object file.

<Functions/Effects>

Electronic paper 108 maintains displayed contents even in a state of non-conduction. Therefore, even when the operation of image forming apparatus 20 is suspended, display to the user can be continued. Therefore, even in the state in which power supply to image forming apparatus 20 is shut off, it is possible for the user to know that an electronic file to be used has been erased, and that a necessary electronic file will be erased when image forming apparatus is to be used after next power on. As a result, it is possible for the user to understand the state of electronic file before turning the power on, and wasteful power supply to the apparatus can be reduced.

In other words, even when electronic paper 108 is in the non-conduction state, the contents displayed thereon can be retained. Therefore, it is possible to continue display for the user even while image forming apparatus 20 is suspended, and necessary message can be given to the user without wasting power.

The present invention is not limited to the embodiment above.

Figure 13:
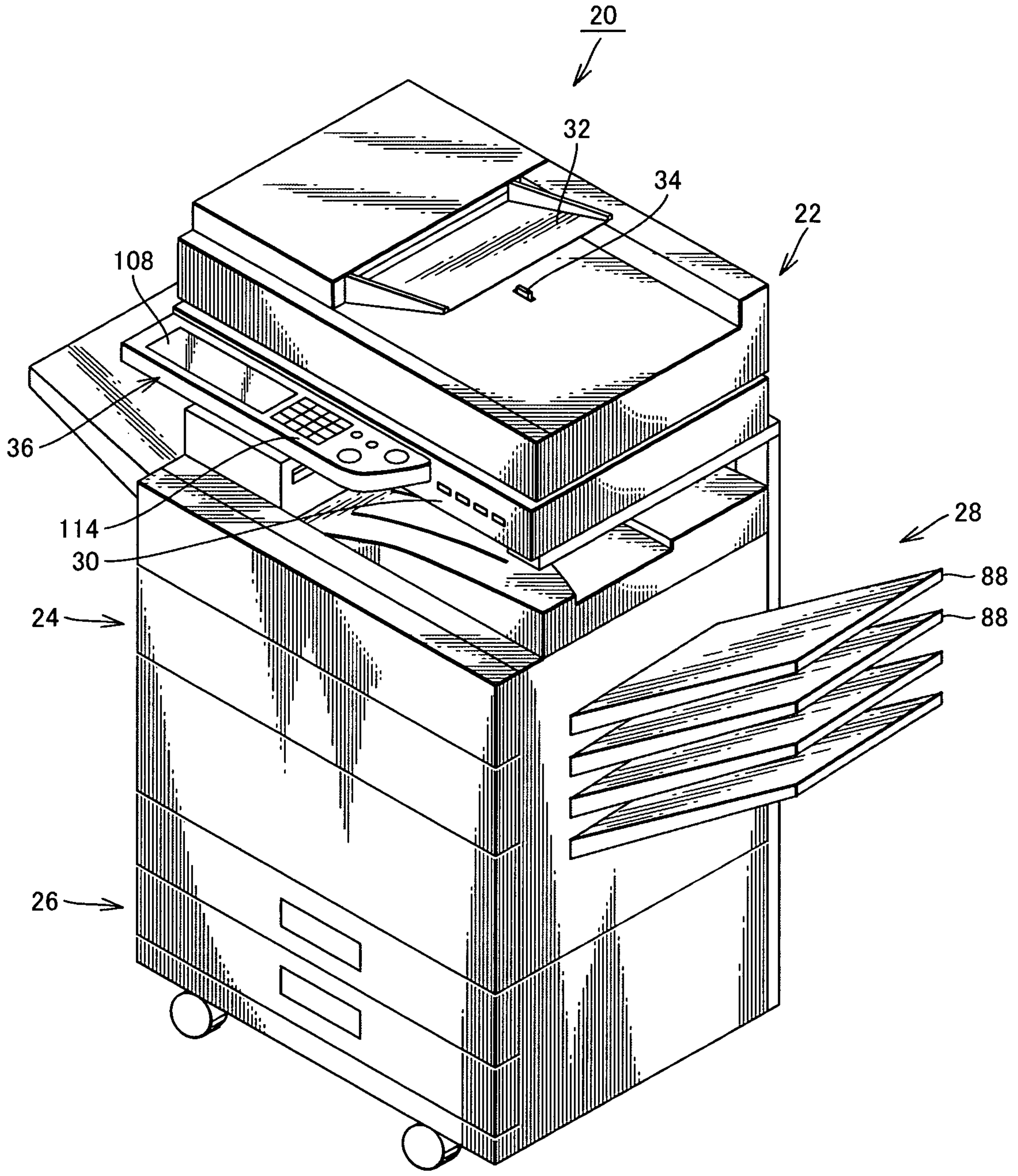
FIG. 13 is a perspective view showing an appearance of the image forming apparatus in accordance with a modification of the present invention.
Figure 14:
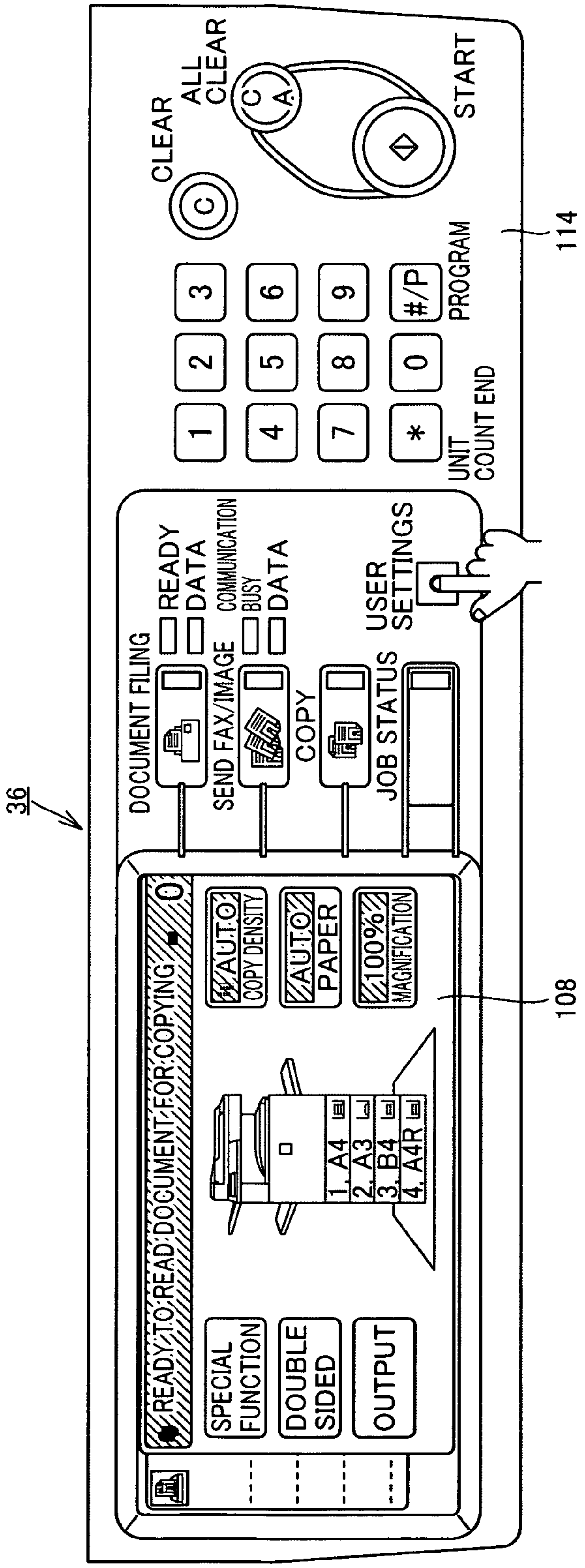
FIG. 14 is a plan view showing an appearance of the operating unit of the modification.

For instance, in the embodiment above, an example has been described in which display panel 116 and electronic paper 108 are provided independent from each other. The present invention, however, is not limited to such a configuration. As shown in FIGS. 13 and 14, in place of display panel 116 of operating unit 36, electronic paper 108 may be provided, and electronic paper 108 may operate also as a display panel of operating unit 36. By this arrangement, display during power conduction and during non-conduction becomes possible without increasing cost of the apparatus, and it is unnecessary for the user to see a plurality of displays. Therefore, interface with the user is not degraded.

Further, the list (job list) of files erased or to be erased may continuously be displayed on electronic paper 108 even after the power of image forming apparatus 20 is turned on. By such an approach, it becomes possible for the user to confirm the information related to the list of files erased or to be erased displayed on electronic paper 108 when power supply is resumed.

Various other design changes and modifications may be made within the scope of claims as appended to the present specification.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:

an input unit for inputting an image;

a storage unit for storing the image input by said input unit;

an erasing unit erasing the image stored in said storage unit when a retention period expires or a designated time is reached;

a first display unit displaying a state of the apparatus when power is supplied to the apparatus;

a second display unit maintaining displayed contents when power is not supplied; and a selecting unit selecting a content related to image erasure to be displayed on said second display unit, wherein said selecting unit selects either a first job list or a second job list as said content to be displayed on said second display unit, said first job list being a list of jobs automatically erased when power was supplied last time to the apparatus, said second job list being a list of jobs to be automatically erased during an operation of the apparatus, and said second display unit is a non-volatile display member.

2. The image forming apparatus according to claim 1, wherein said second display unit also serves as said first display unit.

3. The image forming apparatus according to claim 1, wherein said first job list includes a file or folder name, name of a user who registered the job, time of erasure or expected time of erasure, of a job or jobs automatically erased when power was supplied last time to the apparatus.

4. The image forming apparatus according to claim 1, wherein said job list selected by said selecting unit is displayed on said second display unit also when power is supplied.

5. An image forming apparatus according to claim 1, wherein said second job list includes a file or folder name, name of a user who registered the job, time of erasure or expected time of erasure, of a job or jobs to be automatically erased during an operation of the apparatus.

* * * * *